(No Model.) 3 Sheets—Sheet 2.
R. W. PETERSON & S. B. CLARK.
HOP PICKER.
No. 426,603. Patented Apr. 29, 1890.
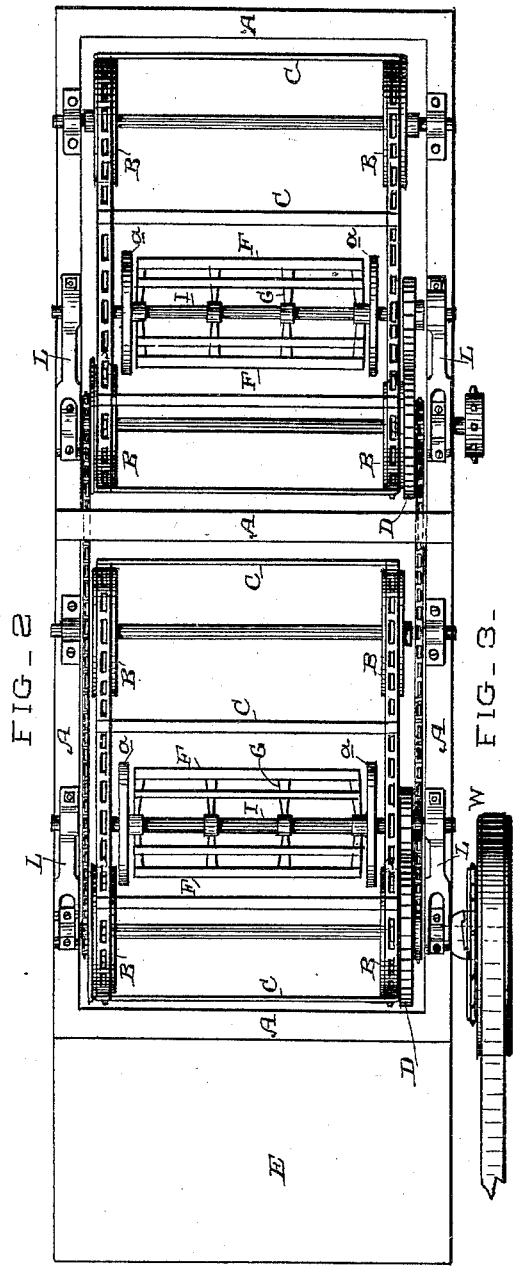
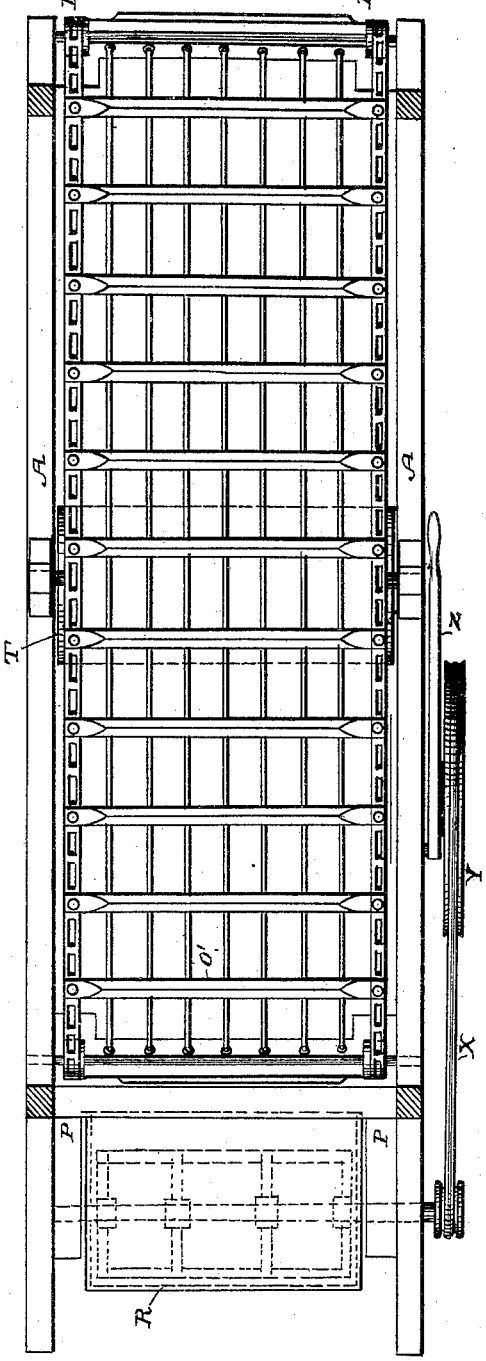
Witnesses,
Geo. H. Strong.
Inventors,
Raford W. Peterson
Samuel B. Clark
By Dewey & Co. Atty

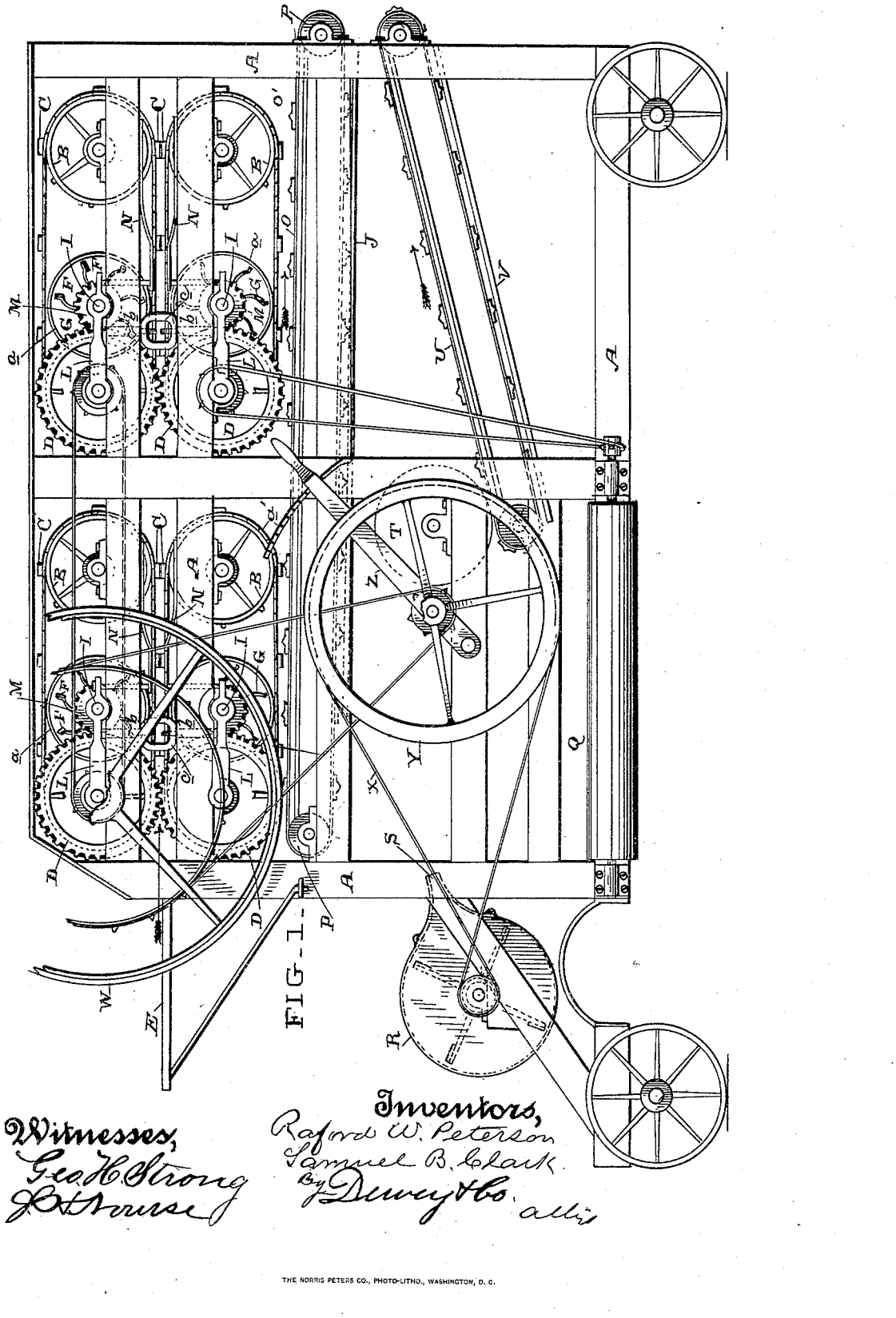

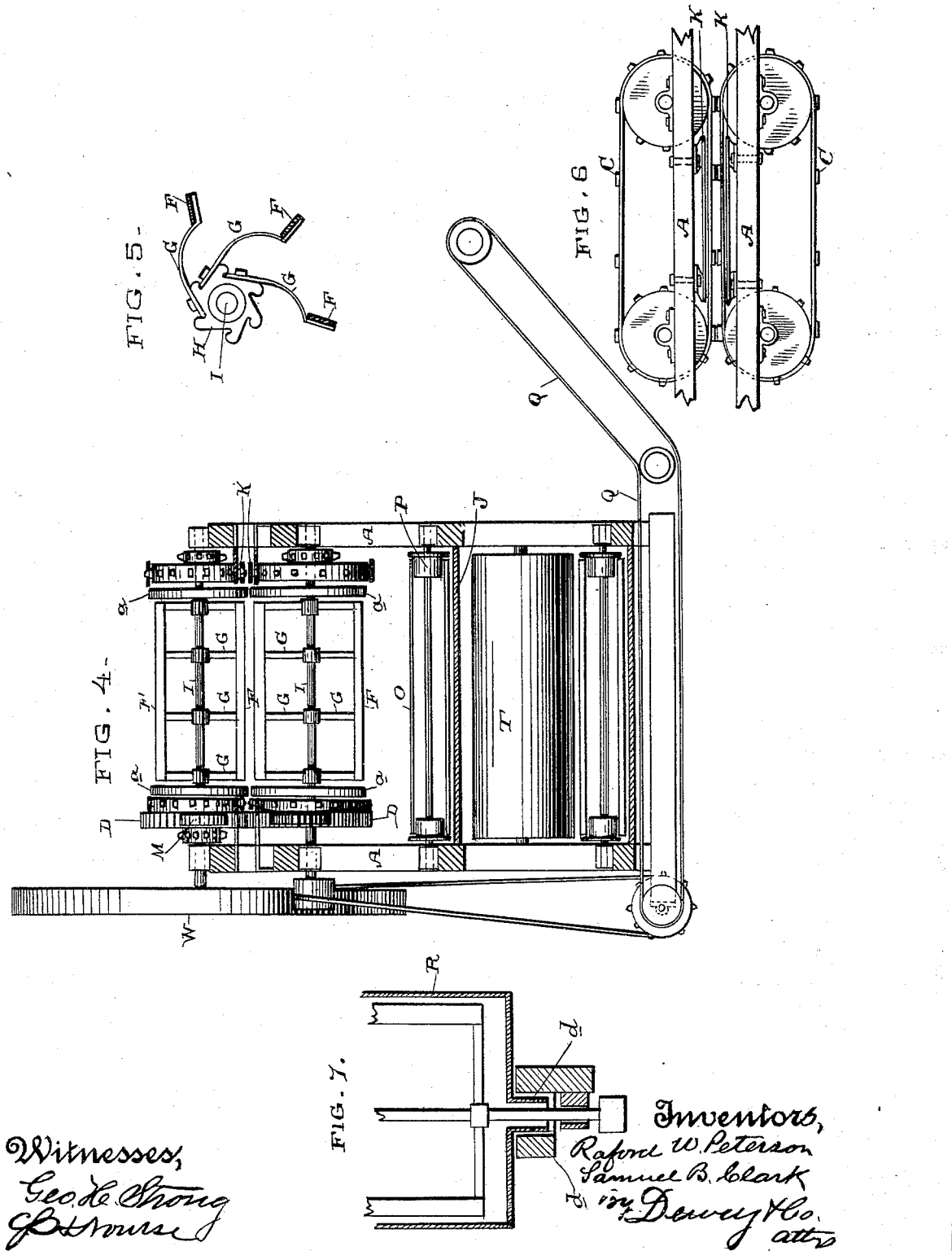

UNITED STATES PATENT OFFICE.

RAFORD W. PETERSON AND SAMUEL B. CLARK, OF SANTA ROSA, CALIFORNIA.

HOP-PICKER.

SPECIFICATION forming part of Letters Patent No. 426,603, dated April 29, 1890.

Application filed August 14, 1889. Serial No. 320,785. (No model.)

*To all whom it may concern:*

Be it known that we, RAFORD W. PETERSON and SAMUEL B. CLARK, of Santa Rosa, Sonoma county, State of California, have invented an Improvement in Hop-Pickers; and we hereby declare the following to be a full, clear, and exact description of the same.

Our invention relates to a machine for picking and separating hops from the vines. It consists, essentially, of sets of belts traveling parallel to each other, having transverse slats between which the vines are held, and cylinders or beaters rotating so as to pull the hops from the vines and drop them upon a carrying-belt below, means for separating the hops from the leaves and for transporting them to a proper receptacle, and in certain details of construction, which will be more fully explained by reference to the accompanying drawings, in which—

Figure 1 is a side elevation of the machine. Fig. 2 is a plan view showing the vine-carrying belts and beaters. Fig. 3 is a horizontal section taken above the plane of the closed hop-carrying belt. Fig. 4 is a transverse section. Fig. 5 is an end view showing one of the beater-hubs with a portion of the arms and beaters attached. Fig. 6 shows the strips K for keeping the slats C in contact. Fig. 7 is a detail of the fan-case.

A is a frame-work of suitable dimensions, having mounted upon the upper part the sprocket-wheels. These wheels are journaled in pairs, so that the wheels carrying one of the horizontal belts are above those carrying another of the horizontal belts. Transverse bars or slats C are secured to these belts extending across from side to side of the machine, and gear-wheels D are fixed upon the ends of two of the upper and lower belt-carrying pulleys, so that the belts will be caused to travel in unison. These belts may be arranged in two or more series. In the present case we have shown two sets of belts standing in line one behind the other. The vines carrying the hops are delivered from the platform E between the belts, where they travel adjacent to each other, and are carried backward by them, the transverse slats C serving to hold the vines and prevent their being pulled out by the action of the beaters, which serve to strip the hops from the vines. The driving-gears move the belts in unison, so that the transverse slats or bars of the upper and lower belts meet exactly, and thus clamp the vines and pull them along.

The beaters consist of bars F, (shown in Fig. 5,) secured to curved elastic arms G, which are secured to hubs H, fixed to shafts I, these shafts being journaled upon the frame and extending across, so that when the beaters are revolved they turn in opposite directions from the travel of the vine-carrying belts, and, striking against the vines, strip the hops from them and cause them to drop through the open slat belts and fall upon a table J, which is fixed beneath the stripping mechanism. The gearing which drives the beater-shafts also moves in unison, so that the beater-bars of the upper and lower strippers will meet upon the vines, and thus forcibly strip off the hops.

At the points where the bars of the beaters would meet those of the carrying-belts it is necessary to temporarily separate the beaters to prevent damage. This is effected by means of the wheels a, which turn loosely upon the beater-shafts, and are of slightly-larger diameter than the beaters. When the transverse bars of the belts pass between these wheels, they temporarily separate them and the beaters, thus preventing the beater-arms from striking the bars of the belts. They close together again immediately after passing the bars.

In order to prevent the belts B from separating too much between their carrying drums or rollers, we have shown bars or plates K extending parallel with the belts and just above and below them, respectively, in the spaces between the belt-carrying wheels. These bars are suitably supported from the frame of the machine and serve to prevent the belts from being too much separated by reason of their flexibility and the pressure of the vines. They are shown in Figs. 4 and 6.

The beater-shafts I are supported in journal-boxes at the end of the arms or links L, and the opposite ends of these links are loosely journaled upon the driving-shafts of the belt-pulleys. This allows the beater-shafts to move up and down with the belt-pulley shafts as a radius, and as the driving-pinions M of the beater-shafts engage with and are driven by the wheels D upon the belt-shafts it will be manifest that the movement of the beater-shafts caused by the passage of masses of vines of varying thickness between them will not throw the pinions out of gear with their driving-wheels. The beater-shafts are drawn together with any desired tension by means of springs N, so that while the beaters are constantly held to their work the elasticity of the arms G and of the springs draws the beaters toward each other, and will keep them to their work, and at the same time will allow them to yield sufficiently for the varying thickness of the masses of vines.

In order to prevent the springs from drawing the beaters too close together, we have shown screw-bolts $b$ passing through the frame-timbers, so that the link-arms L will rest upon the ends of these bolts. The adjacent ends of the bolts $b$ have right and left screw-threads, and by means of a turn-buckle $c$ they are moved out or in and adjusted.

In the present case I have shown two sets of carrying-belts or beaters, one behind the other. The hop-vines are delivered from the first set of carrying-belts. After having been acted upon by the beaters of this set they pass on between the second set, the beaters of which are arranged with reference to those of the first set, so as to act upon such portion of the vines as may have been clamped between the bars and escaped the first set of beaters, thus insuring the stripping of all the hops from the vines. The vines pass on, being carried by the open slat belts, and are delivered at the rear of the machine, from which they may be removed from time to time, as desired.

Above the table J is an endless open slat carrying-belt O, which passes around pulleys P at each end of the machine, which are driven by any suitable connection from the moving parts of the machine. The slats upon the lower part of the belt drag across the table J, and the hops which fall upon this table are thus carried forward, and dropping off the end of the table J they fall upon the transverse carrying-belt Q, which is preferably arranged like the draper of a harvester-header, having an elevating portion which rises and delivers the hops into any desired receptacle. The slats upon the belts O ride under the longitudinally-fixed rods or bars O', forming a grating, the meshes of which are sufficiently near together, so that while the hops fall through and upon the table the upper portion of the belt will receive any leaves and small branches which have been torn from the vines with the hops, and these leaves and limbs are carried backward by the upper portion of the belt and delivered at the rear of the machine with the remainder of the vines. There will still be some leaves which will fall through with the hops, and in order to separate these from the hops we have shown a fan-case R, having a fan adapted to rotate within it in the usual manner. The fan-case itself is journaled upon the sleeve $d$, through which the fan-shaft turns freely and independently, so that the fan-case may be turned to direct the air-discharge nozzle S to any desired point. The blast of air from this nozzle is delivered across the line in which the hops fall from the table J to the belt Q, and while the hops fall through this blast the lighter leaves will be blown backward and strike a roller T, the surface of which is made of rough or fibrous material, to which the leaves partially adhere and are carried over by its rotation and drop upon an open slat carrying-belt U. This belt travels above a second bottom or table V at the lower part of the machine. The action of the belt U is similar to that of the belt O. The leaves which are thrown backward by the blast of the fan are received upon the upper part of this belt and delivered at the rear of the machine, while any small light hops which may have been carried over by the blast will fall upon the table V, and will be carried forward by the returning belt and delivered to the transverse carrier Q. This transverse carrier is run at a considerable speed, so that the hops are thrown some distance from the discharge end by reason of their weight, while any leaves which may have fallen upon this carrier, being lighter, will pass over the discharge end and fall close to it, thus forming a final separation.

Power is transmitted to the machine by means of a belt passing around the main driving-pulley W, which is fixed upon the shaft of one of the vine-carrying belts. Gears transmit power from one or the other of these belts, so that they move in unison, and the vine-carrying belts are preferably formed of chains passing over sprocket-wheels upon their driving-shafts, so as to insure their moving without slip and delivering the vines from one side of the belts to the other in the proper manner.

The fan, open slat belts, and other moving parts of the apparatus are driven by belts or any of the well-known appliances for transmitting motion, these being indicated in the drawings, but not especially noted or claimed.

The proper tension upon the belt X, which drives the fan, is maintained by mounting the shaft of the driving-pulley Y in a movable journal-box, this box being moved by means of a lever Z, which is held at any desired point by means of a holding-rack $a'$, as shown.

Having thus described our invention, what we claim as new, and desire to secure by Letters Patent, is—

1. A machine for stripping hops from the vines, consisting of the open slat belts traveling in proximity with each other and in the same direction from the point where the vines are received, in combination with the rotary arms or beaters acting in pairs above and below the traveling belts, so as to strip the hops from the moving vines, substantially as described.

2. A hop-picking machine consisting of the open slat traveling belts, a mechanism by which they are driven in pairs backwardly from the point where the vines are fed to them, and beaters having elastic arms mounted in pairs above and below the belts and rotated so as to strip the hops from the vines, substantially as described.

3. A hop-picking machine consisting of the open slat carrying-belts traveling in pairs and carrying the vines between the adjacent moving parts of the belts, elastic arms, rotary beaters having their shafts journaled in arms which are loosely attached to the ends of the belt driving-shafts, gears fixed upon the ends of the belt-shafts and pinions upon the beater-shafts meshing with said gears, and springs whereby the beater-shafts are drawn toward each other and allowed to accommodate themselves to the varying thickness of the vines passing between them, substantially as described.

4. In a hop-picking machine, the open slat belts passing around pulleys arranged in pairs one above the other, so that the adjacent portions of the belts travel approximately in contact with each other, beaters revolving so as to strip the hops from the vines which are carried between the traveling belts, and plates or bars K, against which the outer surfaces of the adjacent belts travel in the spaces between the carrying-pulleys, and by which they are prevented from separating, substantially as described.

5. In a hop-picking machine, the combination, with belts for carrying the vines and hops, beaters for stripping the hops from the vines, a table upon which the separated hops are received, and a slat belt, by which the hops are swept off one end of the table, of a transverse traveling belt situated below the delivery end of the table, and a blast apparatus discharging air across the line of the fall of the hops from the table, substantially as described.

6. In a hop-picking machine, the combination, with a mechanism for carrying the vines, stripping the hops therefrom, and delivering them upon a final transfer-belt, of a blast apparatus discharging air across the line of fall of the hops above said belt, a rotary drum situated at one side of the belt in line with the blast, and a supplemental traveling belt U and table V, substantially as described.

7. A hop-picking machine consisting of the open slat endless belts passing around pulleys arranged in pairs one above the other, so that the adjacent portions of the belts travel in the same direction and approximately in contact, the movable spring-actuated arms, rotary beaters having their shafts journaled in said arms, and wheels turning loosely upon said shafts and acting when the transverse slats of the belts pass between them to separate the beaters and prevent contact between them and the slats, substantially as described.

8. A hop-picking machine consisting of the open slat carrying-belts traveling in pairs and in unison, so as to clamp and carry the vines between the adjacent parts of the belts, rotary beaters having their shafts journaled in arms L, which are fulcrumed upon the belt driving-shafts, gears upon the belt-shafts and upon the beater-shafts, whereby the beaters are driven in unison with the belts, springs connected with the arms in which the beater-shafts are journaled, whereby the distance between the beaters is automatically regulated, and the adjustable stop bolts or pins $b$, upon which the movable arms L rest, substantially as described.

In witness whereof we have hereunto set our hands.

RAFORD W. PETERSON.
SAMUEL B. CLARK.

Witnesses:
S. H. NOURSE,
H. C. LEE.